United States Patent
Johnston et al.

(10) Patent No.: US 10,828,582 B2
(45) Date of Patent: Nov. 10, 2020

(54) PASSIVE AIR BLEED FOR IMPROVED COOLING SYSTEMS

(71) Applicant: Tesla, Inc., Palo Alto, CA (US)

(72) Inventors: Vincent G. Johnston, Oakland, MI (US); Paul Daniel Yeomans, S Oxfordshire (GB); Riccardo Marco Pagliarella, San Francisco, CA (US)

(73) Assignee: Tesla, Inc., Palo Alto, CA (US)

( * ) Notice: Subject to any disclaimer, the term of this patent is extended or adjusted under 35 U.S.C. 154(b) by 136 days.

(21) Appl. No.: 15/820,788

(22) Filed: Nov. 22, 2017

(65) Prior Publication Data

US 2018/0117498 A1 May 3, 2018

Related U.S. Application Data

(63) Continuation of application No. 13/489,560, filed on Jun. 6, 2012, now abandoned.

(51) Int. Cl.
*B01D 19/00* (2006.01)
*F28F 9/02* (2006.01)

(52) U.S. Cl.
CPC ............ *B01D 19/0042* (2013.01); *F28F 9/02* (2013.01); *F28F 2265/18* (2013.01); *Y10T 137/3084* (2015.04)

(58) Field of Classification Search
CPC .... B01D 19/0042; F28F 2265/18; F28F 9/02; Y10T 137/3084
USPC .......................................................... 310/52
See application file for complete search history.

(56) References Cited

U.S. PATENT DOCUMENTS

| | | |
|---|---|---|
| 1,646,070 A | 10/1927 | Smith |
| 2,336,068 A | 12/1943 | Hubert |
| 2,343,145 A | 2/1944 | Heiney |
| 3,448,309 A * | 6/1969 | Epp .......................... A61C 1/06 310/51 |
| 3,533,465 A | 10/1970 | Bennett |
| 4,366,858 A | 1/1983 | Moranne |
| 4,457,363 A | 7/1984 | Villeval |
| 4,483,390 A | 11/1984 | Araya et al. |
| 4,491,174 A | 1/1985 | Villeval |
| 4,592,418 A | 6/1986 | Cadars |
| 4,738,115 A * | 4/1988 | Goode ...................... F17C 9/02 62/50.2 |
| 4,747,446 A | 5/1988 | Polidori et al. |
| 4,763,724 A | 8/1988 | Temmesfeld et al. |
| 4,781,247 A | 11/1988 | Schulz |

(Continued)

*Primary Examiner* — Alex W Mok
(74) *Attorney, Agent, or Firm* — Knobbe Martens Olson & Bear LLP

(57) ABSTRACT

An electric vehicle drive unit includes an inverter, a gear box, an electric motor coupled to the inverter and to the gear box, a cooling jacket, and coupled to the gear box, a main coolant inlet, a coolant outlet, and an external passive air bleed device. The cooling jacket has a cooling chamber and surrounds at least a portion of the electric motor. The main coolant inlet couples to the cooling jacket. The coolant outlet is located at a lower portion of the gear box. The external passive air bleed device runs between an upper portion of the cooling jacket and the coolant outlet. The inverter may couple to a first side of the gear box and the electric motor may couple to a second side of the gear box such that the inverter and the electric motor reside on opposite sides of the gear box.

13 Claims, 6 Drawing Sheets

(56) References Cited

U.S. PATENT DOCUMENTS

| | | | |
|---|---|---|---|
| 6,981,850 B1* | 1/2006 | Maltbie | F22B 1/18 |
| | | | 417/201 |
| 7,681,537 B2 | 3/2010 | Savage et al. | |
| 2007/0193291 A1* | 8/2007 | Reddin | B60H 1/00357 |
| | | | 62/239 |
| 2007/0199318 A1* | 8/2007 | Wood | F02B 29/0475 |
| | | | 60/599 |
| 2007/0295825 A1* | 12/2007 | McNaughton | B60S 1/487 |
| | | | 237/12.3 B |
| 2010/0033038 A1* | 2/2010 | Woody | B60K 6/365 |
| | | | 310/54 |
| 2011/0296855 A1 | 12/2011 | Johnston et al. | |
| 2012/0090348 A1 | 4/2012 | ORourke et al. | |
| 2012/0168125 A1 | 7/2012 | Johnston et al. | |
| 2012/0180997 A1 | 7/2012 | Johnston et al. | |
| 2012/0183815 A1 | 7/2012 | Johnston et al. | |

* cited by examiner

PASSIVE AIR BLEED FOR IMPROVED COOLING SYSTEMS

CROSS-REFERENCE TO RELATED APPLICATION

The present U.S. Utility Patent Application claims priority pursuant to 35 U.S.C. § 120 as a continuation of U.S. Utility application Ser. No. 13/489,560, entitled "PASSIVE AIR BLEED FOR IMPROVED COOLING SYSTEMS," filed Jun. 6, 2012, which is hereby incorporated herein by reference in its entirety and made part of the present U.S. Utility Patent Application for all purposes.

BACKGROUND OF THE INVENTION

The present invention relates generally to removal of gas interference in a liquid manifold, and more specifically to liquid cooling, and more specifically, but not exclusively, to passive air removal from a heat transferor that employs liquid coolant.

For purposes of this application, the term liquid coolant heat exchanger encompasses mechanisms that use a liquid fluid (hereafter just "liquid" identifying the liquid subset of fluid phases) to promote heat transfer from one set of components of a system to another set of components in order to maintain a desired operating temperature.

The liquid includes water, water mixtures (e.g., glycol/water formulations), oils, dielectrics, and the like. The liquid is used in cooperation with an interface for heat exchange that provides a liquid-to-air interface or a liquid-to-liquid interface. These interfaces include heat exchangers known as radiators, coolers, cold plate heat sinks, cooling jackets, and the like that move liquid relative to the interface in order to transfer heat.

Cooling effectiveness depends upon several factors including a thermal impedance of the heat exchanger at the interface. The thermal impedance is adversely affected when movement of the liquid is impaired or when the liquid does not directly contact the interface. The greater the impairment in liquid flow or decrease in surface area contact, the more that the thermal impedance increases and heat transfer efficiency declines. A common source of impairment or surface area contact decrease is air entrapment at the interface. Air may be inadvertently introduced (though in other contexts air is purposefully introduced) into the liquid and movement of the entrapped air in the liquid flow causes the liquid stream and the air flow direction to diverge, particularly when entering into chambers, manifolds and the like. The buoyancy of the air causes it to rise and accumulate, and if the rising air accumulates at a critical interface, cooling effectiveness can be degraded.

Conventional liquid heat exchangers and liquid cooling systems are typically designed with pathways in the cooling circuit that allow air to migrate out of the cooling circuit via buoyancy, in many cases by placing an outlet at the top of the component through which coolant is flowing or avoiding internal high points, cavities and pockets that make it difficult for the fluid to carry air through the component without it being trapped. In other design situations, active air scrubbers are required to remove air from highpoints in the system or components being cooled.

In some design situations there are constraints from component packaging and coolant line routing that require component coolant inlets and outlets to be both on the bottom. Such a design can result in a situation where air either rises above the liquid and creates an air pocket, or the cooling system cannot be filled without leaving a large quantity of air trapped in the upper portion of the component once the cooling system pumps are engaged.

What is needed is a system and method for passively removing accumulated gas from a manifold or thermal transfer interface that employs a moving liquid.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for passively removing accumulated gas from a manifold or thermal transfer interface that employs a moving liquid. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
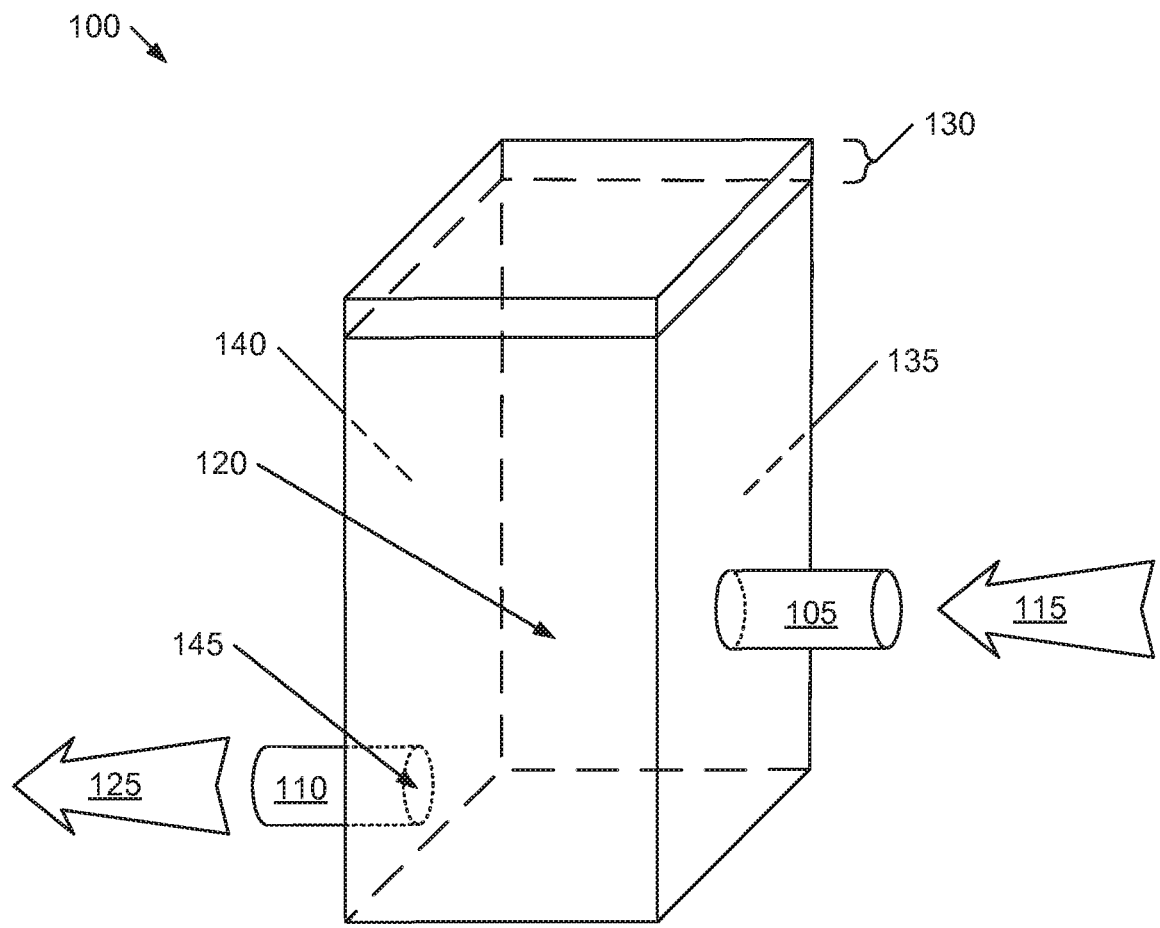
FIG. 1 illustrates a perspective view of a manifold in which entrapped gas introduced from an inlet port accumulates at a top.

FIG. 1 illustrates a perspective view of a manifold 100. Manifold 100 includes a sealed housing with one or more inlets 105 and one or more outlets 110. An input stream 115 of a first moving fluid enters an inlet 105 and begins to fill a chamber 120 of manifold 100. At some point, an output stream 125 of a second moving fluid exits manifold 100 at an outlet 110. Depending upon an arrangement of inlets 105 and outlets 110, and relative flow rates of input stream 115 and output stream 125, chamber 120 fills with a manifold fluid. The manifold fluid is responsible for implementing the function of the manifold by interaction with elements of manifold 100.

Manifold 100 preferably includes one or more rigid walls forming the enclosed space and may be virtually any shape. Inlet 105 and outlet 110 (collectively "ports") are cannulated structures including a channel, with circular, square, or other cross-sections for an outer wall and a perimeter of the channel. Typically the ports and channels both have circular cross-sections and are integrated or joined to a wall of manifold 100.

Input stream 115 includes a mixture of a first fluid with a second fluid that separate when entering chamber 120. The separation is due to differences in densities, with one (e.g., the second fluid) more "buoyant" than the other (i.e., the first fluid). The first fluid is often the desired manifold fluid and the second fluid is inadvertently mixed into the manifold fluid from pumping, cooling, and the like. The second fluid accumulates in chamber 120 (e.g., at a portion 130) and interferes with the manifold fluid interaction. In this context, either of the fluids may one or more liquids, one or more gasses, or combinations thereof.

The accumulation of a fluid (e.g., a gas) at an undesired location in a chamber may occur in other contexts besides separation of an incoming fluid mixture into constituent parts. In some contexts, nucleate boiling may occur on an inner surface, such boiling producing bubbles that release and accumulate within chamber 120. Bubbles may also be created in a bio-reactor resulting from a chemical, biological, or other process, particularly when enhanced through addition of heat. In other contexts, a pump for circulation of the fluid may cause cavitation that introduces bubbles.

In some situations, micro bubbles may be created in a circulating fluid stream that are too small to have sufficient buoyancy to separate in conventional deaeration systems. One reason is that the micro bubbles are readily entrained in the moving fluid and do not accumulate as long as the fluid is moving. However, when circulation stops, the bubbles are able to rise and accumulate in local high spots, such as in a radiator or a motor cooling jacket.

The manifold arrangements and functions, fluid types, fluid separation modalities, and manifold fluid interactions (and interferences) can vary widely within the spirit of the present invention. As an aid to understanding the present invention, a specific embodiment is described and is not to be taken as limiting the scope of the present invention. The following explanation details a specific example for a liquid-cooled heat transfer device used in an electric vehicle (EV).

Manifold 100 as a heat transfer device may thus represent a heat exchanger (e.g., a radiator, a transmission/gear cooler, a cold plate heat sink, a cooling jacket, and the like). A heat transfer device includes a heat transfer interface surface (e.g., a back wall 135 of manifold 100) disposed within chamber 120 that is in thermal communication with an object (e.g., a material, component, device, structure, or the like) that is to be cooled. A liquid coolant (e.g., a water/glycol mixture) enters chamber 120 from inlet 105 and then contacts and moves relative to back wall 135 to transfer heat from the object to the coolant. The transfer of heat causes the coolant within chamber 120 to become heated. The heated coolant exits from chamber 120 via outlet 110 and is replaced with cooler fluid entering from inlet 105. The exiting coolant is cooled and recirculated back to inlet 105 to maintain the object within a desired temperature range. The heat exchanger has a cooling efficiency that depends upon several factors including an efficiency of the heat transfer interaction of the coolant at the heat transfer interface surface (back wall 135 in this case).

It is the case that input stream 115 does not include coolant only, but includes a coolant mixed with a second fluid. In this example, the coolant is mixed with air (the second fluid in this example). As this coolant/air mixture enters into chamber 120, the air separates from the coolant and accumulates at portion 130. The accumulated air in portion 130 displaces coolant and limits/interferes with the cooling interaction of the coolant over a portion of a surface area of back wall 135. This interference degrades the cooling efficiency and can cause a hot spot, an undesired temperature rise of the object or portion thereof, or other undesired condition.

For this arrangement of air mixed into coolant, the air is less dense and its buoyancy causes the air to rise which locates portion 130 at the top of chamber 120. Manifold 100 includes a lateral wall 140 of chamber 120 that defines an aperture 145. An opening of outlet 110 is connected to aperture 145 and is part of the route that fluid exiting from manifold 100 takes when flowing to, and through, outlet 110. In some cases, it may be possible to locate aperture 145 at the top of chamber 120 in portion 130 in order to limit accumulation of air within chamber 120. However, in cases where a location for outlet 110 is constrained and must be located further towards a bottom of chamber 120, the more risk there is that air will accumulate in portion 130 and degrade the desired cooling interaction, with portion 130 expanding in volume as more air accumulates In the context of the present application, up (including terms such as top/upper) and down (including terms such as bottom/lower) are determined by gravitational potential. It is gravitational potential that cause density and buoyancy differences between the first fluid and mixed second fluid to be important considerations for fluid separation and accumulation within chamber 120.

Figure 2:
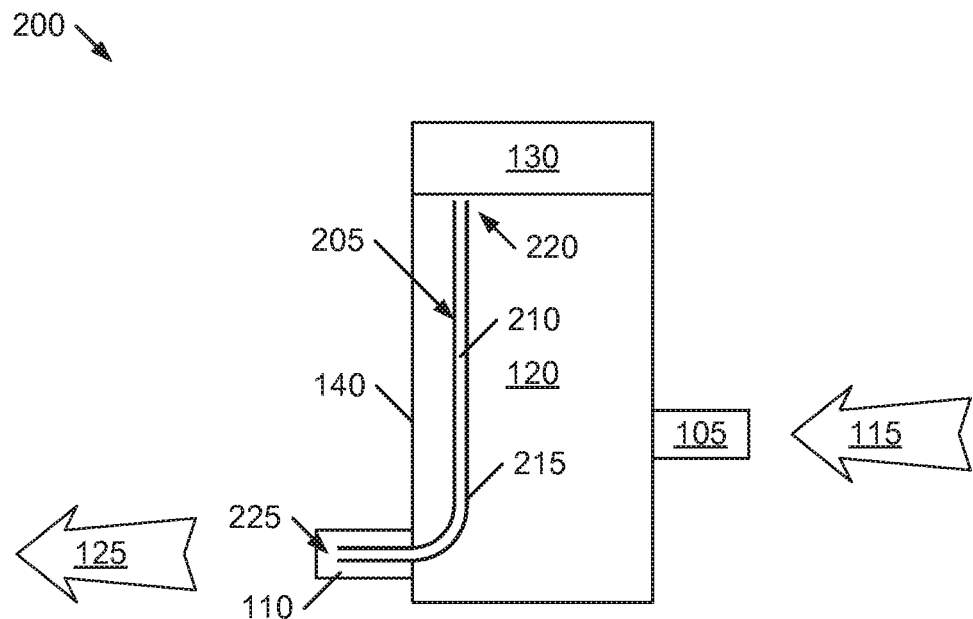
FIG. 2 illustrates a side view of an improved manifold including an internal passive air bleed device.

FIG. 2 illustrates a side view of an improved manifold 200 including manifold 100 of FIG. 1 and an internal passive air bleed device 205. Improved manifold 200 is similar to manifold 100 except that the amount of accumulating gas is passively controlled using internal passive air bleed device 205. Outlet 110 is disposed below a level of portion 130, and more preferably at a bottom of chamber 120. Portion 130 is disposed at the top of chamber 120 when improved manifold 200 operates using coolant/air mixtures for input stream 115.

Internal passive air bleed device 205 is a cannulated structure including a channel 210 provided within an outer wall 215, with circular, square, or other cross-sections for channel 210 and outer wall 215. (Typically the wall and channel both have a circular cross-section.) In FIG. 2, internal passive air bleed device 205 is a rigid tube having a proximal end 220 provided with a first opening and a distal end 225 provided with a second opening. Channel 210 couples the first opening to the second opening.

In FIG. 2, internal passive air bleed device 205 is mounted inside improved manifold 200. Proximal end 220 is disposed near portion 130 and distal end 225 is disposed within outlet 110 at a point outside of chamber 120. Fluid flow through improved manifold 200 produces a jet effect in which a velocity of output stream 125 is faster than fluid flowing inside chamber 120. Consequently, a static pressure in outlet 110 is lower than a static pressure inside chamber 120. Placement of the first opening of internal passive air bleed device 205 inside chamber 120 and placement of the second opening of internal passive air bleed device 205 inside outlet 110 creates a pressure differential that draws in fluid proximate proximal end 220 to be exited at distal end 225. Setting the height of the first opening of internal passive air bleed device 205 within chamber 120 determines a maximum height of portion 130 and a maximum quantity of accumulated gas. As portion 130 increases, for example because of additional accumulation of gas, a boundary of portion 130 moves downward. When the boundary reaches the first opening, accumulated gas enters and is moved through channel 210 to exit from the second opening in outlet 110. Counteracting effects of a rate of gas accumulation from input stream 115 versus gas depletion through internal passive air bleed device 205 determines the actual boundary location. As long as there is a pressure differential, accumulated gas below a level of the first opening of internal passive air bleed device 205 continues to be depleted from chamber 120. The pressure differential exists as long as fluid is flowing through improved manifold 200. "Passive" in the context of internal passive air bleed device 205 means non-motorized, non-powered.

Figure 3:
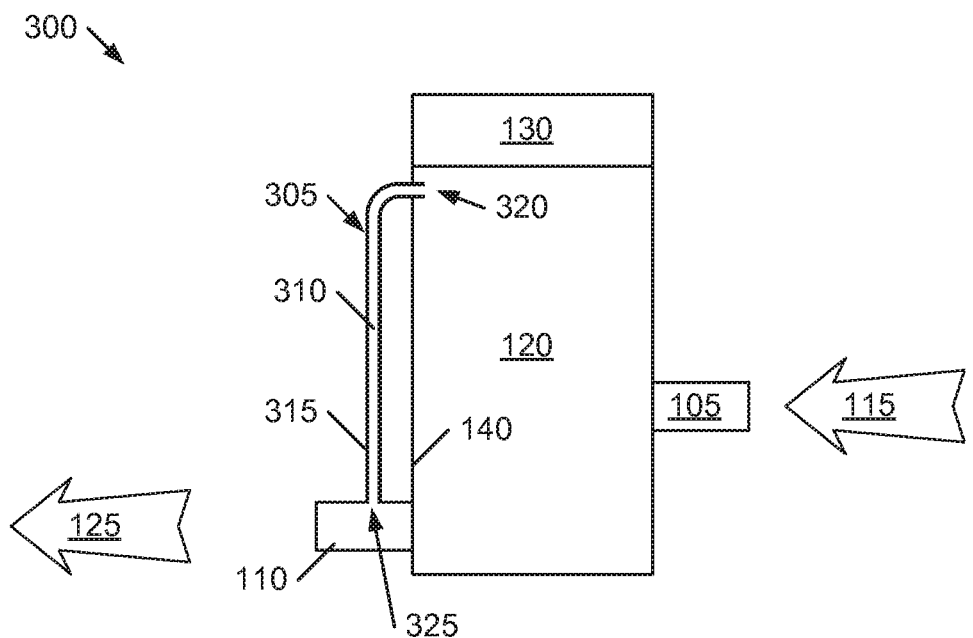
FIG. 3 illustrates a side view of an improved manifold including an external passive air bleed device.

FIG. 3 illustrates a side view of an improved manifold 300 including manifold 100 of FIG. 1 and an external passive air bleed device 305. Improved manifold 300 is similar to manifold 100 except that the amount of accumulating gas is passively controlled using external passive air bleed device 305. Outlet 110 is disposed below a level of portion 130, and more preferably at a bottom of chamber 120. Portion 130 is disposed at the top of chamber 120 when improved manifold 300 operates using coolant/air mixtures for input stream 115.

External passive air bleed device 305 is a cannulated structure including a channel 310 provided within an outer wall 315, with circular, square, or other cross-sections for channel 310 and outer wall 315. (Typically the wall and channel both have a circular cross-section.) In FIG. 3, external passive air bleed device 305 is a rigid tube having a proximal end 320 provided with a first opening and a distal end 325 provided with a second opening. Channel 310 couples the first opening to the second opening.

In FIG. 3, external passive air bleed device 305 is mounted substantially outside improved manifold 300. Proximal end 320 passes through lateral wall 140 and is disposed near portion 130 and distal end 325 is disposed within outlet 110 at a point outside of chamber 120. Fluid flow through improved manifold 300 produces a jet effect in which a velocity of output stream 125 is faster than fluid flowing inside chamber 120. Consequently, a static pressure in outlet 110 is lower than a static pressure inside chamber 120. Placement of the first opening of external passive air bleed device 305 inside chamber 120 and placement of the second opening of external passive air bleed device 305 inside outlet 110 creates a pressure differential that draws in fluid proximate proximal end 320 to be exited at distal end 325. Setting the height of the first opening of external passive air bleed device 305 within chamber 120 determines a maximum height of portion 130 and a maximum quantity of accumulated gas. As portion 130 increases, for example because of additional accumulation of gas, a boundary of portion 130 moves downward. When the boundary reaches the first opening, accumulated gas enters and is moved through channel 310 to exit from the second opening in outlet 110. Counteracting effects of a rate of gas accumulation from input stream 115 versus gas depletion through external passive air bleed device 305 determines the actual boundary location. As long as there is a pressure differential, accumulated gas below a level of the first opening of external passive air bleed device 305 is depleted from chamber 120. The pressure differential exists as long as fluid is flowing through improved manifold 300. "Passive" in the context of external passive air bleed device 305 means non-motorized, non-powered.

Figure 4:
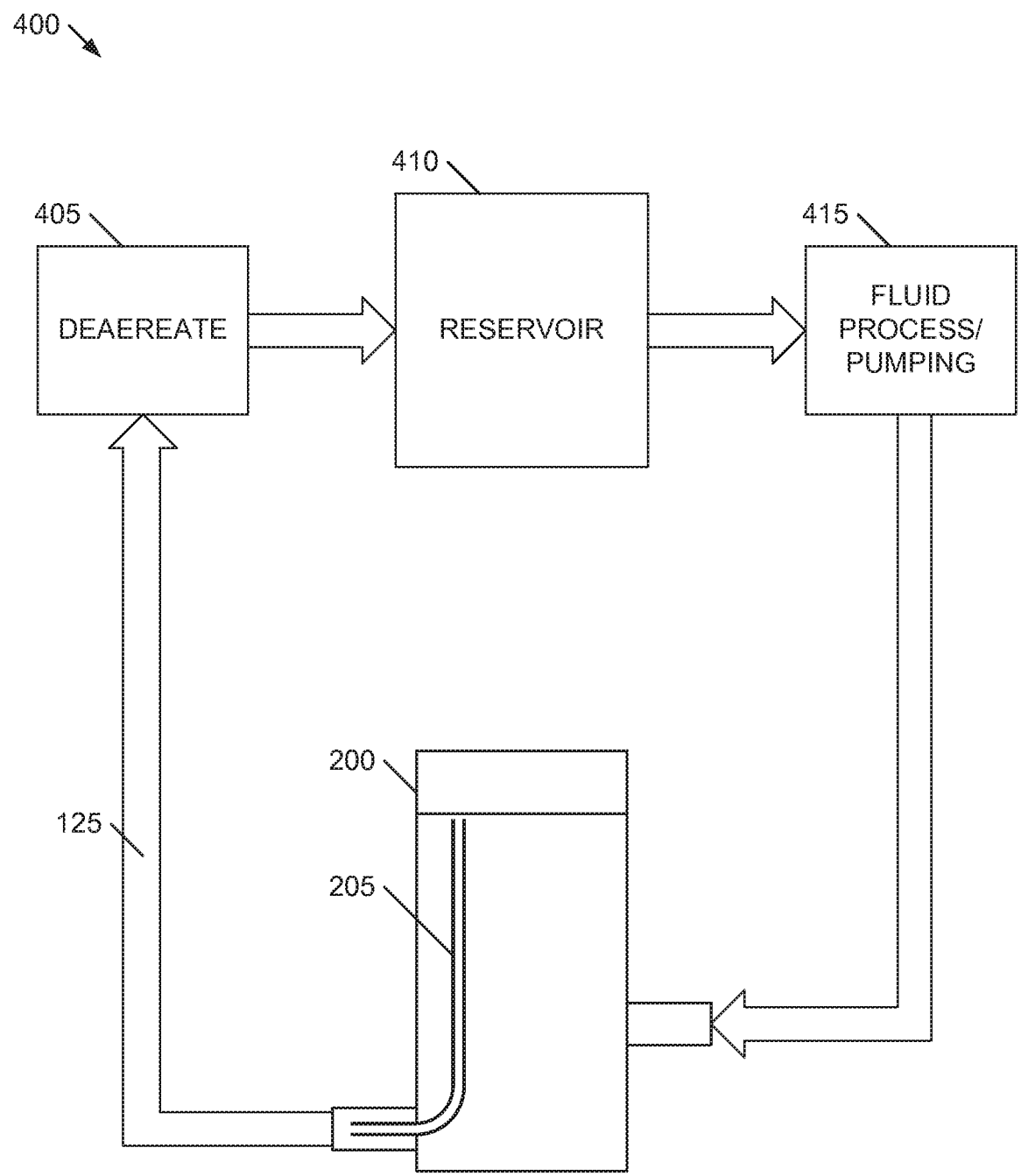
FIG. 4 illustrates a coolant system using a passive air bleed device.

FIG. 4 illustrates a coolant system 400 using improved manifold 200 (it being understood that improved manifold 300 could be substituted for improved manifold 200). In addition to improved manifold 200, coolant system 400 includes a de-aeration subsystem 405, a reservoir 410, and a fluid processing subsystem 415 (often de-aeration is integrated into the reservoir). Coolant system 400 as illustrated is a simplification of an actual coolant system for use with a vehicle. Improved manifold 200 operates as described herein with heated output stream 125 including a coolant having gas drawn through internal passive air bleed device 205 mixed therein. De-aeration subsystem 405 processes heated output stream 125 and removes the mixed-in gas. Coolant, with reduced amounts of inter-mixed air, is then moved into reservoir 410. Subsystem 415 processes coolant from reservoir 410 (for example cools it and pumps it) and returns it to improved manifold 200 to be used to maintain a temperature of the associated object within temperature thresholds. Subsystem 415 also collectively represents the various processes and functions that inadvertently introduce and mix gas into the coolant. Improved manifold 200 provides an option for designers of coolant system 400 to reduce the heat transfer interferences resulting from accumulation of this inadvertently introduced gas.

Figure 5:
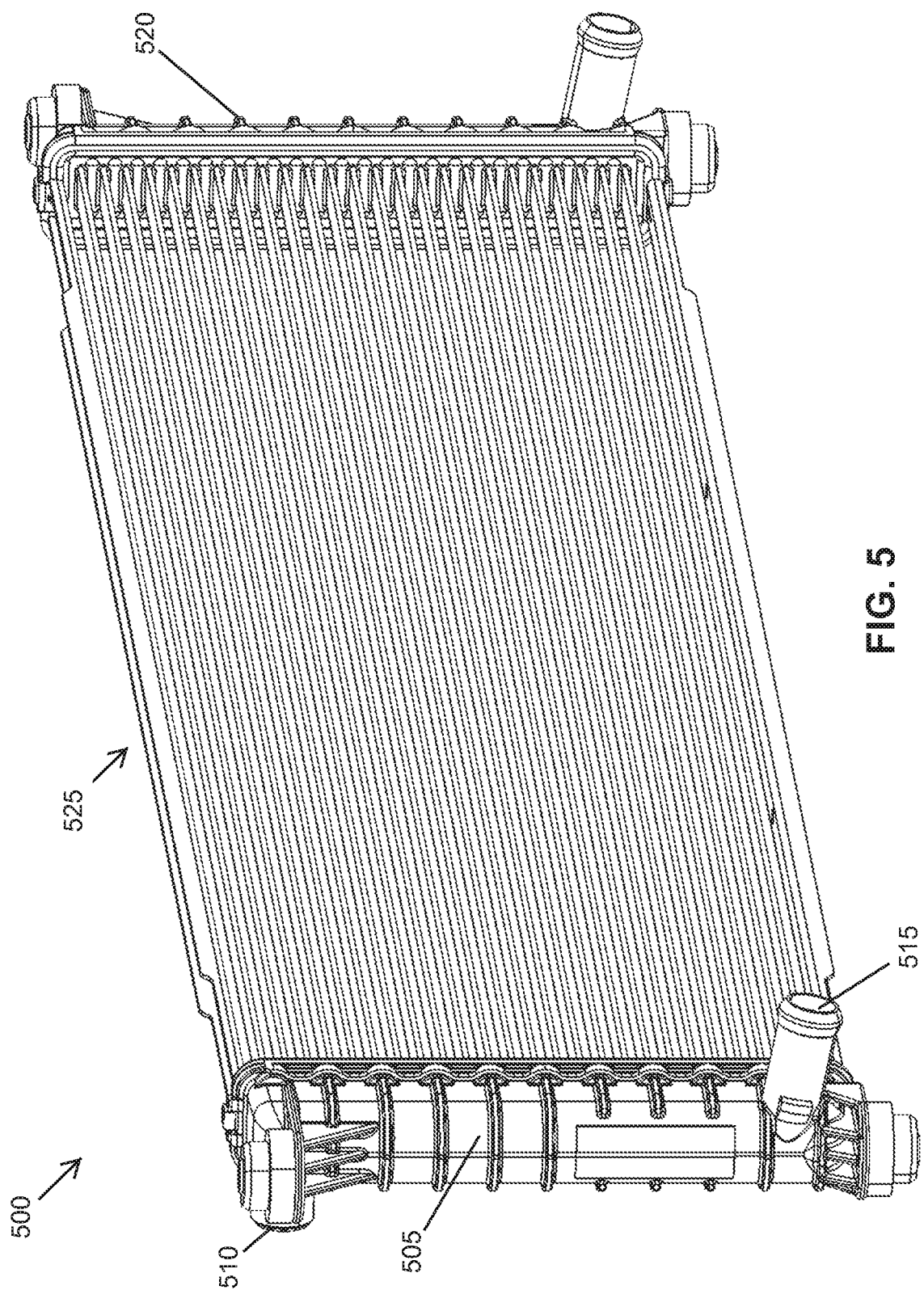
FIG. 5 illustrates a radiator employing an internal passive air bleed device.
Figure 6:
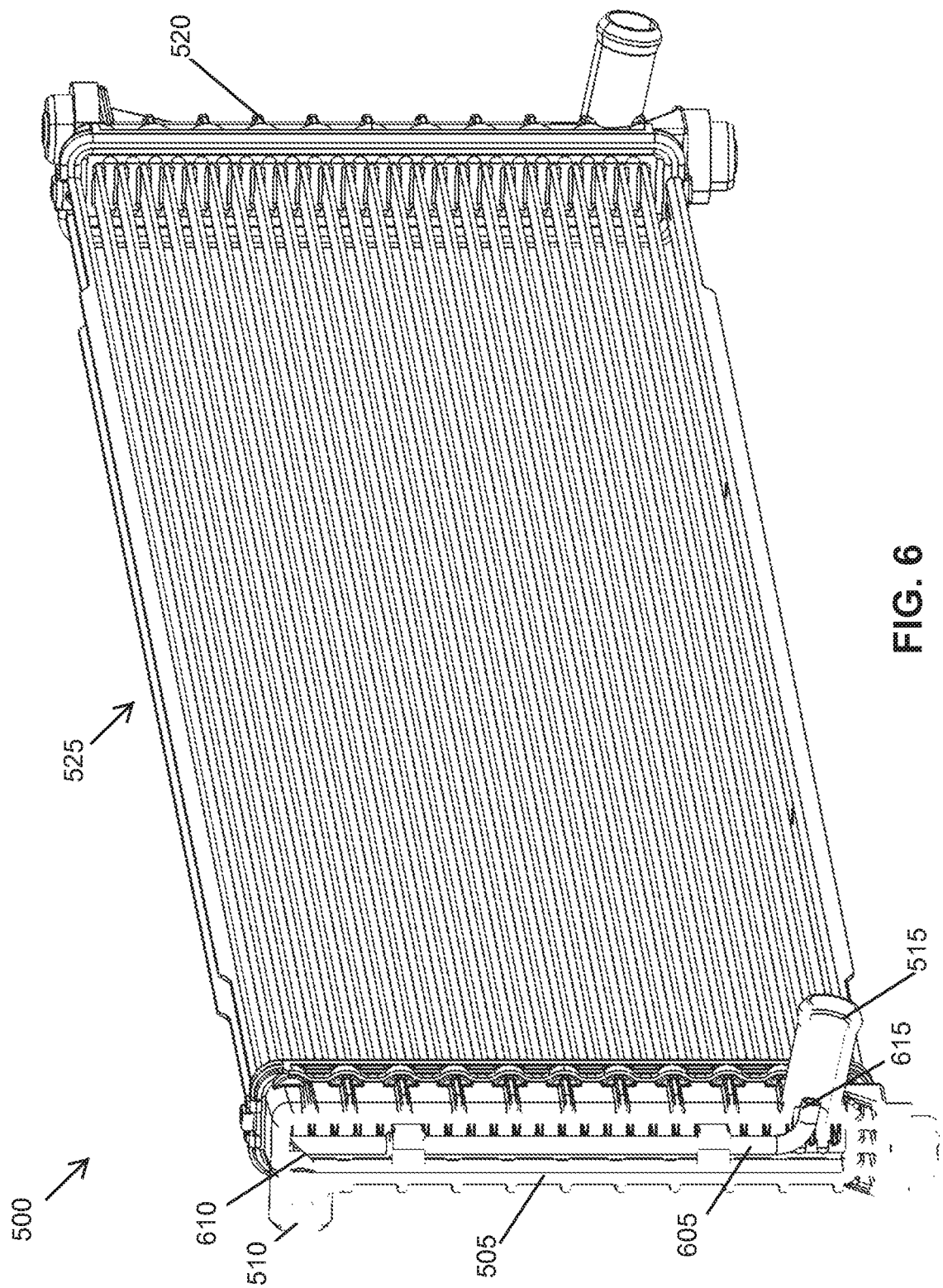
FIG. 6 illustrates the radiator of FIG. 5 with a cut-away revealing the internal passive air bleed device.

FIG. 5 illustrates a radiator 500 employing an internal passive air bleed device, and FIG. 6 illustrates radiator 500 with a cut-away of a portion of an inlet tank 505 revealing an internal passive air bleed device 605. Radiator 500 includes inlet tank 505 coupled to an inlet 510 and an outlet 515. Coolant flowing into inlet tank 505 is distributed and circulated through cooling tubes 525 before entering into a second tank 520 as a cooled coolant. A first opening 610 of internal passive air bleed device 605 is set high in inlet tank 505 to help inhibit any air accumulation from interfering with coolant flow through any of cooling tubes 525. A second opening 615 of internal passive air bleed device 605 is shown disposed inside outlet 515 and outside of inlet tank 505.

Figure 7:
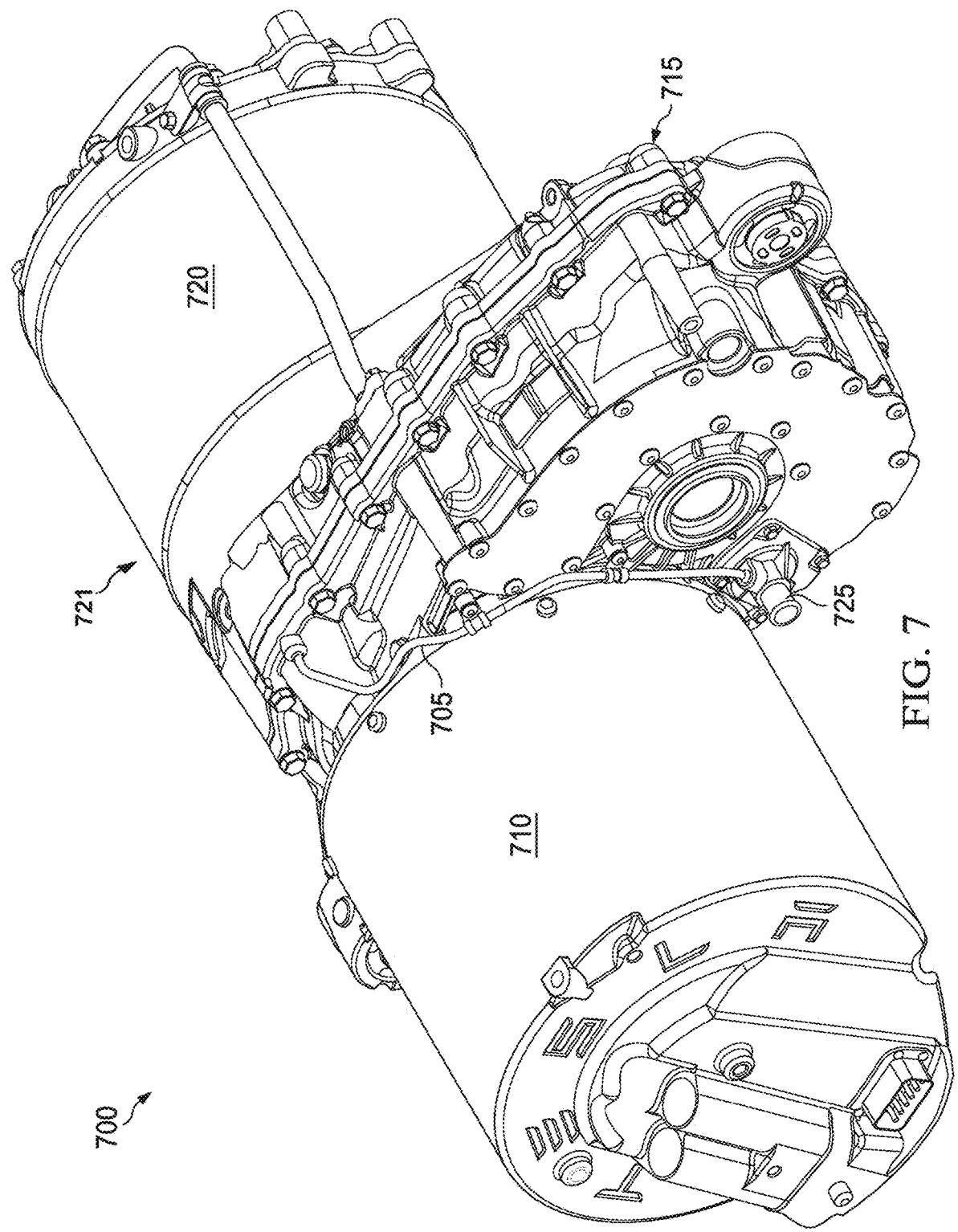
FIG. 7 illustrates a drive unit for an electric vehicle incorporating an external passive air bleed device.

FIG. 7 illustrates a drive unit 700 for an electric vehicle incorporating an external passive air bleed device 705, similar to external passive air bleed device 305 shown in FIG. 3. Drive unit 700 includes an inverter 710 on a left-hand side of the illustration, a gear box 715 in the middle, and an electric motor 721 having a cooling jacket 720 on a right-hand side. A main coolant inlet (not shown) is near an axis of the motor housing and a coolant outlet 725 (similar to outlet 110) is positioned at a bottom of gear box 715 near inverter 710. External passive air bleed device 705 is a small line that runs outside drive unit 700 from a top point near a junction of gear box 715 and cooling jacket 720.

Coolant enters into the main coolant inlet and enters into a cooling chamber of cooling jacket 720. The coolant cools the electric motor 721 as it flows through the cooling chamber towards outlet 725. External passive air bleed device 705 removes accumulated air from cooling jacket 720 by entraining it into coolant exiting from outlet 725 as described herein.

While the above description has focused principally on use of local passive air bleed devices for cooling embodiments in the context of re-entraining separated fluids from coolant mixtures, there are a wide variety of potential applications and embodiments of the present invention, some of which have been suggested herein. In the context of a bio-reactor or other sealed manifold, some applications may desirably have a defined gas volume above a liquid volume. This may be for chemical or bio-reactions or the like. Use of a passive air bleed device responsive to a fluid stream into and out of the sealed manifold would allow for continuous introduction of a gas into the sealed manifold while maintaining a specific concentration of gas species in the defined gas volume. The gas volume is set by placement and operation of the passive air bleed device and fluid flow rates as discussed herein along with a height and shape of the sealed manifold.

The system and methods above has been described in general terms as an aid to understanding details of preferred embodiments of the present invention. In the description herein, numerous specific details are provided, such as examples of components and/or methods, to provide a thorough understanding of embodiments of the present invention. In some embodiments, it is most convenient and reliable to dispose the distal end of a passive bleed device in an outlet coupled to the same chamber that includes the proximal end. Other embodiments need not be so configured, with the distal end disposed in any lower pressure region (as compared to a static pressure at the proximal end).

The alternative location for the distal end may be another outlet or other system passively producing a reliable low static pressure region, preferably a local region. This is not to be construed as, and is different from, a traditional bleed system where a bleed port is placed at a top of a radiator and routed to a reservoir, from which any air stays in the reservoir while circulating coolant passing through the bleed system is drawn back into the bottom of the main coolant stream from an outlet at a bottom of the reservoir. A benefit of the present embodiment is that the passive air bleed device is located in proximity or inside of the chamber which is being de-aerated, and does not require a bleed line to a reservoir. In some vehicles, the chamber (e.g., a motor jacket) is at an opposite end of the vehicle from the reservoir which, for a conventional system, would require a dedicated bleed line running from one end to the other.

For reliability and dependability, particularly in critical applications, embodiments for the passive bleed device will be rigidly mounted, rigid tubes disposed and operating as disclosed herein. In some applications, it may be advantageous to employ flexible and/or moveable passive air bleed devices. For example, a passive air bleed device having a flexible outer wall and a proximal end fitted with a float would allow the first opening to move towards shifting fluid accumulation portions within the improved manifolds (this is easier to implement for internally disposed passive air bleed devices). This is advantageous for applications in which an orientation of the improved manifold twists and rotates so that the 'up' direction varies significantly and/or constantly.

Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An electric vehicle drive unit comprising:
a gear box;
an inverter coupled to a first side of the gear box;
an electric motor coupled to a second side of the gear box such that the inverter and the electric motor reside on opposite sides of the gear box;
a cooling jacket having a cooling chamber, surrounding at least a portion of the electric motor, and coupled to the second side of the gear box;
a main coolant inlet coupled to the cooling jacket;
a coolant outlet located at a lower portion of the gear box; and an external passive air bleed device running between an upper portion of the cooling jacket and the coolant outlet.

2. The electric vehicle drive unit of claim 1, wherein the main coolant inlet is located near an axis of the electric motor.

3. The electric vehicle drive unit of claim 1, wherein the electric vehicle drive unit is configured to:
receive coolant at the main coolant inlet;
direct the coolant to flow through the cooling chamber to cool at least the electric motor; and
direct the coolant to flow out of the coolant outlet.

4. The electric vehicle drive unit of claim 3, wherein the electric vehicle drive unit is further configured to direct the coolant to flow through the cooling chamber to cool the gear box.

5. The electric vehicle drive unit of claim 1, wherein the external passive air bleed device is configured to remove accumulated air from the cooling jacket by entraining it into coolant exiting from the coolant outlet.

6. The electric vehicle drive unit of claim 1, wherein the external passive air bleed device is a tube that runs outside of the electric motor, outside of the inverter, and outside of the gear box from a junction of the gear box and the cooling jacket to the coolant outlet.

7. An electric vehicle drive unit comprising:
an inverter;
a gear box;
an electric motor coupled to the inverter and to the gear box;
a cooling jacket having a cooling chamber, surrounding at least a portion of the electric motor, and coupled to the gear box;
a main coolant inlet coupled to the cooling jacket;
a coolant outlet located at a lower portion of the gear box; and
an external passive air bleed device running between an upper portion of the cooling jacket and the coolant outlet.

8. The electric vehicle drive unit of claim 7, wherein:
the inverter is attached to a first side of the gear box; and
the electric motor is attached to a second side of the gear box that is opposite the first side of the gear box.

9. The electric vehicle drive unit of claim 7, wherein the main coolant inlet is located near an axis of the electric motor.

10. The electric vehicle drive unit of claim 7, wherein the electric vehicle drive unit is configured to:
receive coolant at the main coolant inlet;
direct the coolant to flow through the cooling chamber to cool at least the electric motor; and
direct the coolant to flow out of the coolant outlet.

11. The electric vehicle drive unit of claim 10, wherein the electric vehicle drive unit is further configured to direct the coolant to flow through the cooling chamber to cool the gear box.

12. The electric vehicle drive unit of claim 7, wherein the external passive air bleed device is configured to remove accumulated air from the cooling jacket by entraining it into coolant exiting from the coolant outlet.

13. The electric vehicle drive unit of claim 7, wherein the external passive air bleed device is a tube that runs outside of the electric motor, outside of the inverter, and outside of the gear box from a junction of the gear box and the cooling jacket to the coolant outlet.

* * * * *